United States Patent
Chu et al.

(10) Patent No.: US 6,522,874 B1
(45) Date of Patent: Feb. 18, 2003

(54) USER KEY VALIDATION TO PREVENT FRAUD DURING SYSTEM HANDOFFS

(75) Inventors: Thomas S. Chu, Chandler, AZ (US); Darryl Sale, Grand Forks, ND (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/500,514

(22) Filed: Feb. 9, 2000

(51) Int. Cl.[7] .............................. H04Q 7/20; H04Q 7/36
(52) U.S. Cl. ........................ 455/411; 455/411; 455/410; 455/427; 455/428; 455/430; 455/436; 455/438; 455/12.1; 380/270
(58) Field of Search ................................. 455/411, 410, 455/412, 422, 427, 428, 430, 432, 436, 437, 438, 439, 440, 442, 445, 11.1, 12.1, 13.1, 13.3, 16, 517, 403; 380/270

(56) References Cited

U.S. PATENT DOCUMENTS

| | | | |
|---|---|---|---|
| 5,715,297 A | * | 2/1998 | Wiedeman .................. 455/427 |
| 5,920,804 A | | 7/1999 | Armbruster et al. |
| 6,240,074 B1 | * | 5/2001 | Chandos et al. ............ 455/428 |
| 6,317,500 B1 | * | 11/2001 | Murphy ...................... 455/410 |

* cited by examiner

Primary Examiner—William Trost
Assistant Examiner—Keith Ferguson

(74) Attorney, Agent, or Firm—Ingrassia, Fisher & Lorenz, P.C.

(57) ABSTRACT

A user key validation during a handoff verifies the subscriber using the wireless communication system and prevents fraudulent use of the system. A wireless communication system (10) has a number of satellites (20, 22, 24) with which a subscriber unit (12) establishes a communication link. However, as the quality of the transmitted signal between an active satellite (22) and the subscriber unit (12) degrades, a handoff of the communication link with the subscriber unit (12) will occur if the subscriber (12) meets the authentication requirements of the system (10). The active satellite (22) generates user keys and transmits the user keys to the active subscriber units (12). A request of a handoff is made from the individual subscriber unit (ISU) (12) to the losing SV (22). The losing SV (22) communicates with the gaining SV (20) to establish a handoff. The losing SV (22) sends the user key of the ISU (12) to the gaining SV (20). The gaining SV (20) authenticates the ISU (12) by comparing the ISU user key to a user key stored in the losing SV (22). The gaining SV (20) becomes the active satellite, and generates and transmits the user key to the ISU. Notification of the authentication is sent to an earth terminal controller (30). The earth terminal controller (30) provides the losing SV (22) with notification that the handoff is complete. The authentication a prevents further fraud if the subscriber fraudulently obtained access to the system during the original call set up.

15 Claims, 3 Drawing Sheets

USER KEY VALIDATION TO PREVENT FRAUD DURING SYSTEM HANDOFFS

BACKGROUND OF THE INVENTION

1. Field of the Invention

The present invention relates generally to authentication of a subscriber in a wireless communication system, and more particularly, to authentication during handoffs of the communication signals within the wireless communication system.

2. Description of the Related Art

Many wireless communication systems use authentication to enhance the security of the system. A wireless communication system typically includes many individual subscriber units (ISU) such as hand held telephone or data devices which communicate with a network of satellites or base stations. A gateway with fixed network intelligence, such as a switching station, communicates with the network of satellites. The switching station that the subscriber accesses with the network of satellites may not be a home switching station because the subscriber is roaming. The switching station in which the roaming subscriber uses is therefore considered a visiting switching station. The subscriber will communicate with the visiting switching station, which in turn communicates back to the home switching station via a public switched telephone network (PSTN) or other type of connection such as a satellite link. This communication with the home switching station permits retrieval of account information about the ISU, including authentication, and transmission of billing information about subscriber use.

Authentication of a subscriber unit in a wireless communication system traditionally occurs during the call set up. The fixed network intelligence grants the use of the communication system to the ISU after the requesting ISU satisfies the authentication requirements of the system. Once the authentication process is completed successfully and the call connection is established, the subscriber can utilize any of the satellites or terrestrial base stations within the communication system.

A satellite based wireless communication system typically includes a plurality of satellites, each of which can handoff the communication link with the ISU to another satellite within the system. For example, in a wireless communication system with a plurality of satellites or space vehicles (SVs), the ISU establishes a communication link with an active satellite. The satellites move in orbit such that the signal quality between the ISU and an active satellite diminishes. However, as the satellites orbit, a new satellite will move into proximity with the ISU such that the new satellite can provide improved quality signal transmission. Typically, the ISU will determine which satellite can provide greater signal quality. A handoff of the communication link with the ISU will occur from the satellite losing the signal (losing SV) to the satellite gaining the signal (gaining SV).

As part of known satellite communication systems, authentication does not occur during a satellite handoff. If an ISU gains unauthorized access during the initial call set up, then the unauthorized user can continue to communicate illegally over the system for the duration of the call, even when handoffs are performed and completed. Accordingly, it is desirable to provide a system and technique for authenticating an ISU during handoffs within a satellite or terrestrial based wireless communication system.

BRIEF DESCRIPTION OF THE DRAWINGS

The various advantages of the present invention will become apparent to one skilled in the art by reading the following specification and appended claims, and by referencing the following drawings in which:

DETAILED DESCRIPTION OF THE INVENTION

Figure 1:
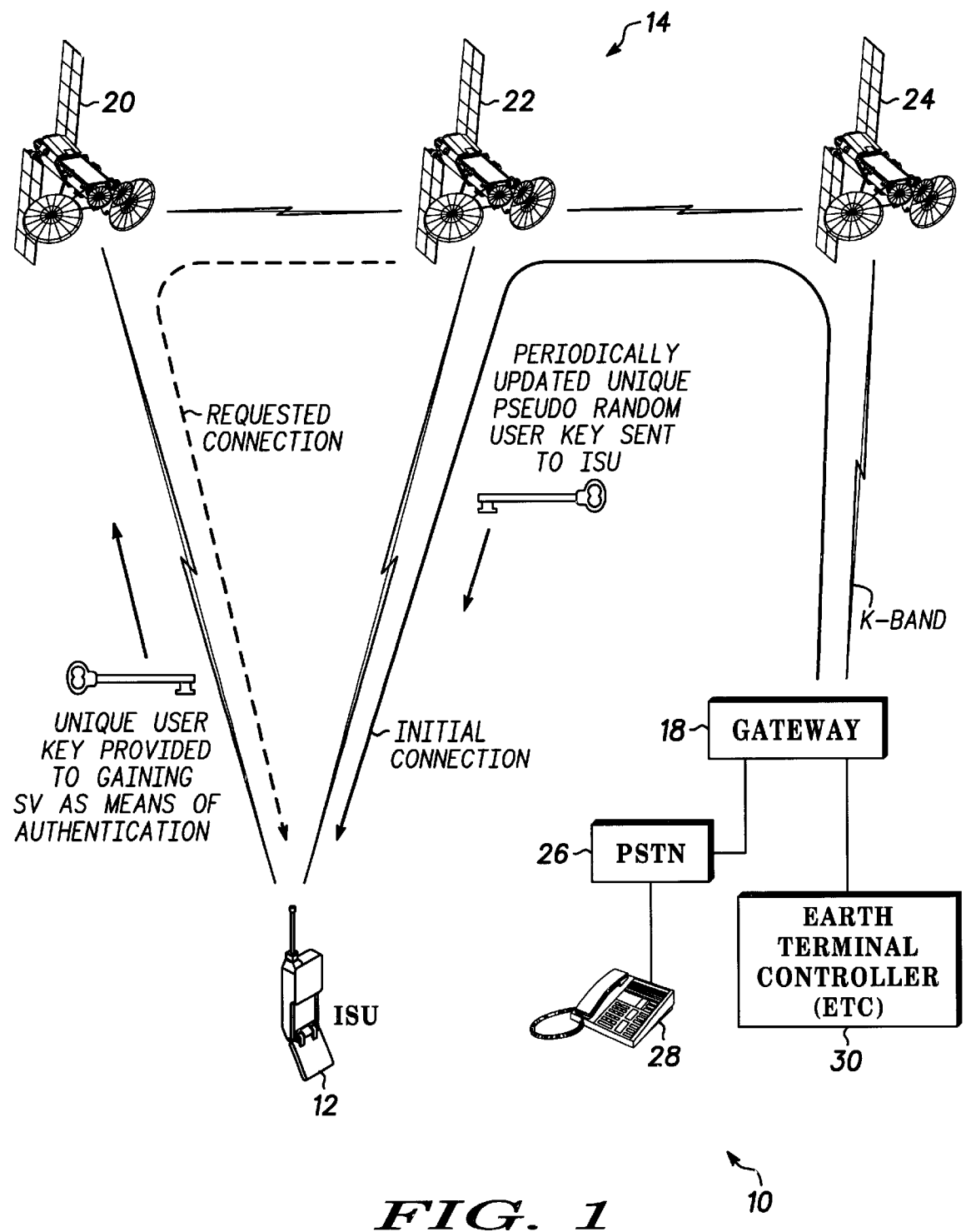
FIG. 1 shows a wireless communication system and user key validation system in accordance with the present invention.

FIG. 1 generally depicts a wireless communication system 10. Wireless communication systems typically include, but are not limited to, paging systems, personal communication systems and data communication systems. A wireless communication system typically includes many individual subscriber units (ISU) 12 simultaneously communicating with a communication network such as a satellite network, and is described below by way of example. Although a satellite network 14 is described as the preferred embodiment, it will be appreciated by those skilled in the art that the authentication technique described herein can be readily extended to any wireless communication system, including those that utilize terrestrial base stations instead of satellites. An active subscriber of the system such as ISU 12 sets up a call connection with any other ISU or a land-based telephone subscriber via the satellite network 14. The ISU may include devices such as a handheld unit, a standalone phone booth, or any other communication device designed for use with the satellite network 14.

In the preferred embodiment, the satellite network 14 has a plurality of satellites, including a first satellite 20 and a second satellite 22. An active ISU 12 is preferably in communication with at least two satellites. The ISU 12, however makes an initial contact with the satellite network 14 via an initial satellite 22, and establishes a reserved traffic channel as a communication link. The initial satellite 22 is orbiting in space within a distance from ISU 12 to provide a reserved traffic channel that transmits signals between the ISU 12 and the satellite network 14. If the initial satellite 22 is the closest satellite in proximity to a gateway 18 associated with the ISU 12, then the initial satellite 22 makes a direct link with gateway 18. In the preferred embodiment, however, if the local gateway 18 is located under the coverage of a different satellite in the network of satellites 14, the initial satellite 22 makes a link via a local satellite 24 which has the closest proximity to the gateway 18. Different satellites will appear above the gateway 18 because the satellites are continuously orbiting such that coverage by the local satellite 24 to the gateway 18 changes. If setting up the call with a land based telephone service 28 is needed, the gateway 18 communicates with a local PSTN 26. The local satellite 22 relays the information, including authentication data, received from the ISU 12 via the satellite network 14 to gateway 18. The gateway 18 also includes a processor module known as an earth terminal controller (ETC) 30. As part of the present invention, the ETC 30 performs the initial authentication to permit the set up of the call.

Although the ISU 12 communicates with an initial satellite 22 during the set up of the call, the ISU 12 will not continue to maintain a communication link with only one satellite in the satellite network 14. Each satellite projects a tightly-focused beam over the ground below as it travels through space. This beam creates a reserved traffic channel that the ISU 12 utilizes as a communication link for a duration of time in which the beam transmits signals with a sufficient quality for minimizing data loss. The communication link established between an active satellite and the ISU will degrade, however, as the satellite moves out of range of the ISU. The communication link quality is maintained through a handoff by transferring the communication link established between the ISU 12 and the losing satellite or losing SV 22 to a communication link between the ISU 12 and a gaining satellite or gaining SV 20.

As will be appreciated by one skilled in the art, the handoff process changes the satellite with which the ISU 12 communicates from a losing SV 22 to a gaining SV 20. The losing SV 22 is a satellite in which a communication link over a reserved traffic channel is established with the ISU 12, but the transmitted signal quality degrades. A gaining SV 20 is a satellite in which establishing a communication link is desired based on the strength of the transmitted signal. In the preferred embodiment, first satellite 22 becomes the losing SV and second satellite 20 becomes the gaining SV. It can be appreciated, however, that during a call any of the satellites may become a losing SV or a gaining SV depending on the movement and position of each satellite in the orbit path which affects the communication link signal quality. Typically, the ISU 12 determines the communication link signal quality of many SVs in the satellite network 14.

A handoff is requested preferably by the ISU 12 and occurs once the signal quality degrades between the losing SV 22 and the ISU 12. In the preferred embodiment, the ISU 12 was authenticated at the time the call was set up with the initial satellite 22. Authentication during the handoffs prevents further fraud by verifying the ISU 12 that is using the satellite network 14. An unauthorized ISU who began communication with the satellite network 14 would otherwise fraudulently continue to communicate with other satellites in the satellite system 14, after a handoff.

As part of the present invention, the losing SV 22, while having an established communication link with the ISU 12, generates and sends a user key to every active ISU currently establishing a communication link with losing satellite 22, including the ISU 12. The user keys are preferably sent distributed (or alternatively all at once) to active ISUs 12 during the calls. The user keys are preferably transmitted at regular intervals, for example, but not limited to, every maintenance burst or approximately once every ten seconds. A user key is assigned to each active ISU 12, and each of the user keys is stored by each of the active ISUs. In the preferred embodiment, a copy of valid user keys is stored in a memory 92 (FIG. 3) within the losing SV 22, although the user keys can be stored in any other satellite, the gateway, or any other communication device designed for use with the satellite network 14. The user key allows for validation of the ISU 12 during a handoff, and permits a communication link to be established between a validated ISU 12 and a gaining SV 20 such as satellite 20 of the satellite network 14. The transmission of the user key also verifies that the communication link is established with the gaining SV 20 because the successful transmission of the user key indicates other data will be transmitted from the ISU 12 and properly received by the gaining SV 20.

When the ISU 12 determines that the signal quality of the traffic channel has significantly degraded such that the losing SV 22 cannot transmit acceptable quality signals, then the ISU 12 selects from the satellite system 14 the next satellite, such as the gaining SV 20, to which the communication link is to be handed off. The ISU 12 then requests a handoff from the losing SV 22. The losing SV 22 will request a pathend channel from the gaining SV 20, and the gaining SV 20 will assign a pathend channel. In the preferred embodiment, the request for a pathend channel includes transmission of all of the user keys generated and stored by the losing SV 22. The user keys will then be used by the gaining SV 20 for authentication. The losing SV 22 then establishes a temporary connection with the gaining SV 20 for exchange of the user key information and other overhead information. In the preferred embodiment, the temporary connection for example can be a virtual connection. The virtual connection establishes a communication link from the losing SV 22 to the gaining SV 20 and back to ISU 12. The virtual connection permits transmission of authentication data, including the user key, as well as user data within the satellite network 14, rather than requesting a handoff from the gateway 18 and transmitting data via gateway 18 which increases handoff time and loss of data. Accordingly, the virtual connection decreases signal processing time and minimizes the loss of data.

The losing SV 22 provides a handoff response that the handoff is complete to the ISU 12. The handoff response includes the data regarding the channel of the gaining SV 20 to be used for the communication link. The gaining SV 20 also can request authentication from the ISU 12 at any time to verify the ISU. The ISU 12 will need to respond with the correct user key or be dropped from the communication network. After the ISU 12 provides a user key, the gaining SV 20 authenticates the user by comparing the ISU user key with the user key received from the losing SV 22 and stored in the memory 92. If authentication of the user key is successful, then the gaining SV 20 provides notification of the handoff to the ETC 30 which is preferably connected to the gateway 18. A traffic channel is established between the gaining SV 20 and the ISU 12 as a communication link. The ETC notifies the losing SV 22 that the handoff is complete, and the losing SV 22 removes the virtual connection. The gaining SV 20 then resumes the generation and distribution of the user key to the ISU 12 as described above.

Figure 2:
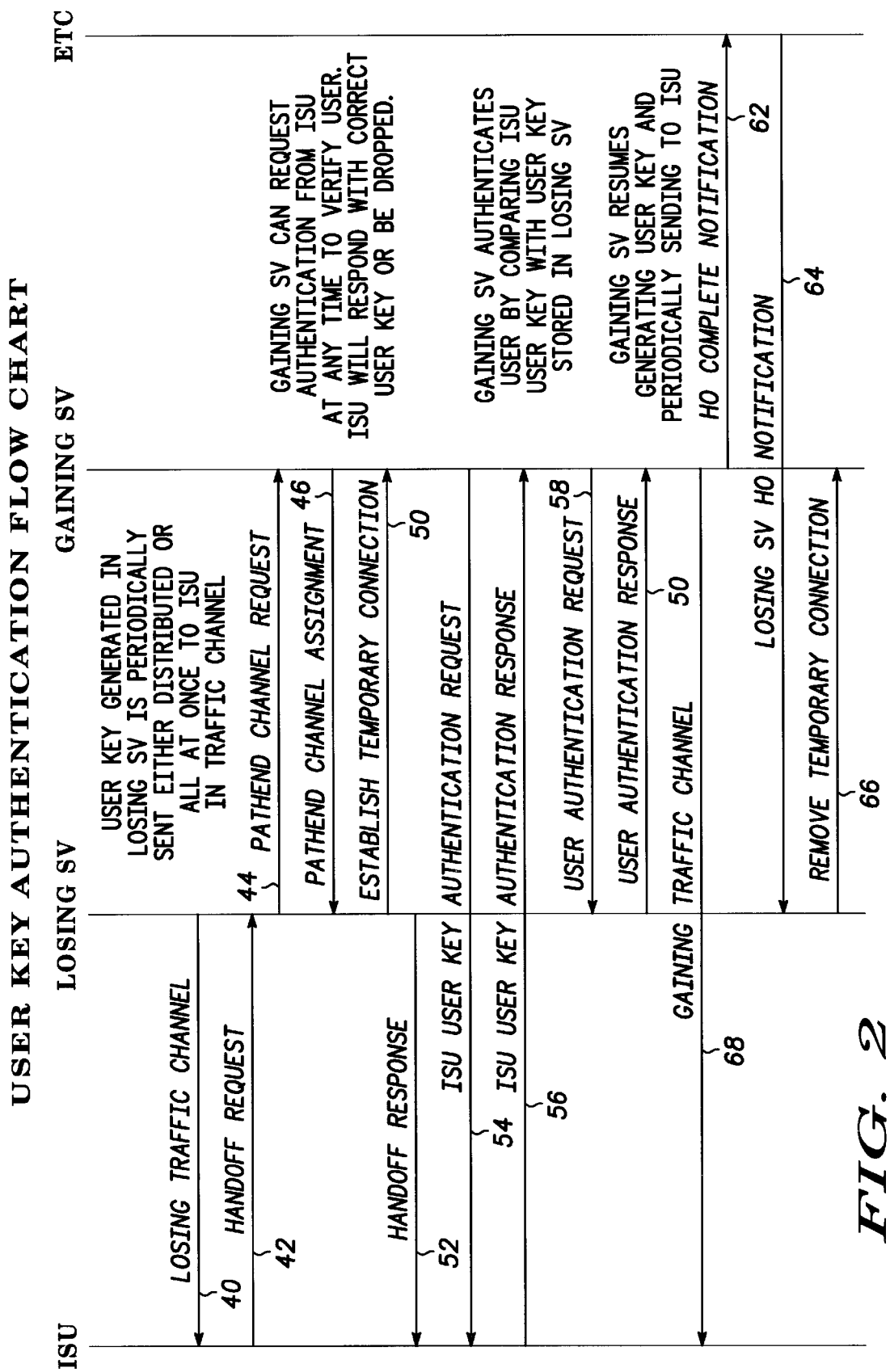
FIG. 2 shows a flow diagram of the operational sequence for implementing the user key validation system according to the teachings of the present invention.
Figure 3:
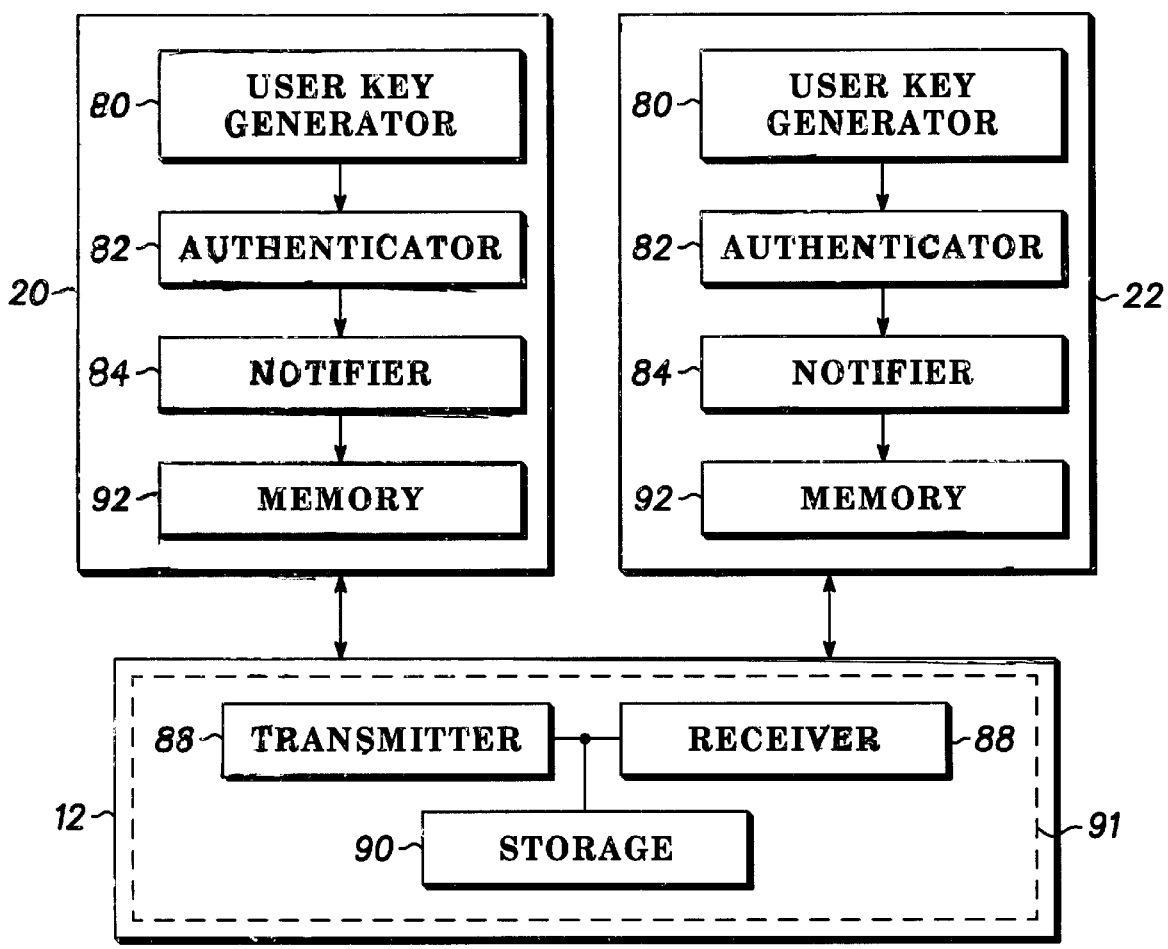
FIG. 3 shows a preferred embodiment of the user key validation system of the present invention.

FIG. 2 shows a flow diagram of the user key validation technique implemented during a handoff. After a call connection is established, a traffic channel 40 provides a communication link between the ISU 12 and losing SV 22. The traffic channel 40 preferably transmits the user key from the losing SV 22 to the ISU 12. The ISU intermittently measures the signal quality of the satellites 22, 20 in the network. If the ISU 12 determines the signal quality is diminished, then the ISU initiates a handoff request 42. The losing SV 22 receives the handoff request 42, and initiates a pathend channel request 44 to the gaining SV 20. The gaining SV 20 provides a channel assignment 46. The losing SV 22 establishes a temporary connection 50 between the losing SV 22 and the gaining SV 20. The temporary connection 50 is for example, but not limited to a virtual connection, such as that described above. The losing SV 22 provides a handoff response 52 to the ISU 12. The gaining SV 20 requests a user key 54 from the ISU at anytime after the temporary connection 50 is established. If the ISU 12 provides an authentication user key response 56 to the gaining SV 20, then the gaining SV 20 authenticates the ISU user key with the user key stored in the memory 92 of the losing SV 22 (FIG. 3). If the ISU 12 does not provide an authentication response to the gaining SV then the ISU is dropped or prohibited from communicating with the gaining SV 20. If the gaining SV 20 authenticates the ISU 12, then the gaining SV 20 provides a completed handoff notification 62 to the earth terminal controller (ETC) 30. The ETC 30 provides a handoff notification 64 to the losing SV that the handoff is complete. The gaining SV 20 resumes generating and periodically sending the user key to the ISU 12 over the established gaining traffic channel 68. The losing SV 22 removes the temporary connection 66 to the gaining SV 20, and the losing SV 22 is eliminated from the communication link. As one skilled in the art will readily appreciate, the gaining SV 20 will eventually become a losing SV 22 as the ISU 12 and the satellite move away from one another, and a new gaining SV 20 is in proximity to the ISU 12 for providing improved signal quality.

FIG. 3 illustrates a preferred embodiment user key validation system of the present invention. The satellite system comprises a network of satellites 14 which include satellite 20 and satellite 22 (shown in block diagram form). After a call set up, a communication link is established between the losing SV 22 and the ISU 12. The ISU 12 can also detect the proximity of at least one other satellite, such as gaining SV 20, in addition to the losing SV 12.

Each of the satellites in the satellite system has a user key generator 80, an authenticator 82, a notifier 84, and a memory 92. The ISU 12 has a transmitter 86 for transmitting communication signals such as the user key, a receiver 88 for receiving communication signals such as a user key, and a user key storage memory 90. As shown, the transmitter 86, the receiver 88 and the user key storage memory 90 comprise the user key module 91. The user key generator 80 of the losing SV 22 has an established communication link with ISUs and generates user keys. A copy of the user keys is stored in the memory 92. The user keys are each sent to individual active ISUs 12. The receiver 88 of the ISU 12 obtains the user key. The user key is then stored in the user key storage 90. When the ISU 12 requests a handoff, the losing SV 22 will communicate a request to the gaining SV 20. The authenticator 82 of the gaining SV 20 will request the user key of the ISU 12 from the losing SV 22 and will request the user key from the ISU 12. The authenticator 82 within the gaining SV 20 validates the authentication of the ISU 12 based on the user keys from the losing SV 22 and ISU 12. If authentication is successful, then the notifier 84 of the gaining SV 20 transmits a handoff complete notification to an ETC 30 and to the losing SV 22.

The foregoing discussion discloses and describes exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A method for user key validation during system handoff in a wireless communication system comprising:
   generating a user key by a first satellite;
   sending the user key from the first satellite to an individual subscriber unit (ISU) via a communication link, the communication link being established between the ISU and the first satellite;
   handing off the communication link from the first satellite to a second satellite, the second satellite requesting transmission of the user key from the ISU;
   authenticating the ISU by the second satellite by comparing the user key transmitted by the ISU with a copy of the user key stored in a memory associated with one of the first satellite and the second satellite.

2. The method of claim 1 further including the step of sending a notification of the authentication to an earth terminal controller, the earth terminal controller providing the first satellite with a notification that the handoff is complete.

3. The method of claim 1 wherein the step of handing off further includes establishing a temporary communication connection between the first satellite and the second satellite.

4. The method of claim 3 further including the step of removing the temporary communication connection between the first satellite and the second satellite.

5. The method of claim 3 wherein the temporary connection is a virtual connection.

6. The method of claim 1 further including the step of establishing a communication link between the second satellite and the ISU, and wherein the second satellite generates the user key.

7. The method of claim 6 further including the step of transmitting the user key from the second satellite to the ISU.

8. A method for user key validation during system handoffs in a wireless communication system comprising:
   establishing a traffic channel between an individual subscriber (ISU) and a losing satellite (losing SV);
   generating a user key by the losing SV;
   sending the user key from the losing SV to the ISU via the traffic channel;
   requesting a handoff from the losing SV to a gaining satellite (gaining SV);
   transmitting a handoff signal from the losing SV to the ISU;
   requesting transmission of an ISU user key from the ISU to the gaining SV;
   authenticating the ISU by comparing the ISU user key to a user key stored in the losing SV;
   establishing a traffic channel between the gaining SV and the ISU, the gaining SV generating an updated user key;
   transmitting the updated user key from the gaining SV to the ISU;
   sending a notification of the authentication to an earth terminal controller, the earth terminal controller providing the losing SV with notification that the handoff is complete; and
   removing the temporary connection between the losing SV and the gaining SV.

9. The method of claim 8 further including the steps of:
   requesting a pathend channel from a gaining SV;
   establishing a pathend channel between the gaining SV and the losing SV; and
   establishing a temporary connection between the losing SV and the gaining SV;
   after the step of requesting a handoff from the losing SV.

10. The method of claim 9 wherein the step of requesting of a pathend channel further includes the transmission of the ISU user key stored in the losing SV to the gaining SV.

11. The method of claim 10 further including the step of removing the temporary connection between the losing SV and the gaining SV after the ISU user key is transmitted from the losing SV to the gaining SV.

12. The method of claim 8 wherein the temporary connection is a virtual connection.

13. An apparatus for validating a user key during a handoff in a wireless communication system comprising:

an individual subscriber unit (ISU) having a user key module, the user key module for receiving, storing, and transmitting the user key;

a losing satellite for communicating with the ISU, the losing satellite having a user key generator for creating user keys, and a user key memory for storing and transmitting the user key;

a gaining satellite for communicating with the ISU, the losing satellite, and a communication gateway, the gaining satellite having an authenticator module for verifying the user key sent by the losing satellite to the ISU by performing a user key comparison; and an earth terminal controller for communicating with the ISU, the losing satellite and the gaining satellite, the earth terminal controller notifying the losing satellite of the handoff.

14. The apparatus of claim 13 wherein the user key comparison is performed by comparing the user key sent from the ISU to the gaining satellite with a copy of the user key sent from the losing satellite to the gaining satellite.

15. The apparatus of claim 13 wherein the gaining satellite generates an updated user key and transmits the updated user key to the ISU after completing the handoff.

* * * * *